US009072398B2

(12) United States Patent
Choo et al.

(10) Patent No.: US 9,072,398 B2
(45) Date of Patent: Jul. 7, 2015

(54) MOTOR-DRIVEN CURTAIN OR BLIND ASSEMBLY

(75) Inventors: Chong Kun Choo, Singapore (SG); Hong Seng Tan, Singapore (SG)

(73) Assignee: Jackson Global Pte. Ltd., Singapore (SG)

( * ) Notice: Subject to any disclaimer, the term of this patent is extended or adjusted under 35 U.S.C. 154(b) by 338 days.

(21) Appl. No.: 13/372,296

(22) Filed: Feb. 13, 2012

(65) Prior Publication Data

US 2013/0127603 A1 May 23, 2013

Related U.S. Application Data

(63) Continuation of application No. 13/369,231, filed on Feb. 8, 2012, now abandoned.

(60) Provisional application No. 61/562,416, filed on Nov. 21, 2011, provisional application No. 61/562,420, filed on Nov. 21, 2011.

(51) Int. Cl.
*G05B 11/01* (2006.01)
*A47H 1/04* (2006.01)
(Continued)

(52) U.S. Cl.
CPC ................ *A47H 1/04* (2013.01); *Y10T 16/375* (2015.01); *Y10T 16/373* (2015.01); *E05D 15/0626* (2013.01); *E05F 15/18* (2013.01); *E05F 15/2076* (2013.01); *E05Y 2400/456* (2013.01); *E05Y 2400/612* (2013.01); *E05Y 2400/628* (2013.01); *E05Y 2400/652* (2013.01); *E05Y 2400/80* (2013.01); *A47H 5/0325* (2013.01); *A47H 2001/045* (2013.01); *E05F 15/60* (2015.01); *E05F 15/77* (2015.01)

(58) Field of Classification Search
None
See application file for complete search history.

(56) References Cited

U.S. PATENT DOCUMENTS

| | | | | |
|---|---|---|---|---|
| 4,839,544 | A * | 6/1989 | Sakai | 310/12.04 |
| 5,398,900 | A * | 3/1995 | Schober | 248/251 |
| 7,382,067 | B2 * | 6/2008 | Nakagawa et al. | 310/15 |
| 7,498,700 | B2 * | 3/2009 | Ohno | 310/12.22 |

(Continued)

FOREIGN PATENT DOCUMENTS

JP 2006-254581 A 9/2006

OTHER PUBLICATIONS

International Search Report and Written Opinion of PCT Application No. PCT/IB2012/002906 mailed Jun. 24, 2013.
Co-pending U.S. Appl. No. 13/369,231 by Choo, C.K. filed Feb. 8, 2012.

*Primary Examiner* — Firmin Backer
*Assistant Examiner* — Shawna M Kingston
(74) *Attorney, Agent, or Firm* — Renner, Otto, Boisselle & Sklar, LLP

(57) ABSTRACT

Systems and methods for a motor-driven curtain or blind assembly are provided. For example, in some embodiments the motor drive assembly includes a track, a lead runner, and a plurality of sensors. The track can have a plurality of coils that can be electrically activated to generate an electromagnetic field to cause the lead runner to slide along the track. The lead runner may include magnet housing with a magnet to interact with the electromagnetic field. In some embodiments, the plurality of sensors or switches can be disposed between the coils. The sensors can be configured to activate the electromagnetic field locally to cause the lead runner to slide along the track. Examples of the sensors or switches include, but are not limited to, a reed switch, a silicone magnetic switch, an optical switch, a mechanical limit switch, a proximity switch, a magnetic encoder, or an optical encoder.

15 Claims, 18 Drawing Sheets

(51) Int. Cl.

| | |
|---|---|
| ***E05D 15/06*** | (2006.01) |
| ***E05F 15/18*** | (2006.01) |
| ***E05F 15/20*** | (2006.01) |
| ***A47H 5/032*** | (2006.01) |
| ***E05F 15/60*** | (2015.01) |
| ***E05F 15/77*** | (2015.01) |

(56) References Cited

U.S. PATENT DOCUMENTS

2006/0225358 A1 10/2006 Haag et al.
2008/0088188 A1* 4/2008 Busch .......................... 310/68 B
2008/0250716 A1* 10/2008 Ranaudo et al. .................. 49/31

* cited by examiner

MOTOR-DRIVEN CURTAIN OR BLIND ASSEMBLY

CROSS REFERENCE TO RELATED APPLICATIONS

This application is a continuation application of U.S. patent application Ser. No. 13/369,231, filed on Feb. 9, 2012 and titled "MOTOR-DRIVEN CURTAIN OR BLIND ASSEMBLY" and claims the benefit of U.S. Patent Application Nos. 61/562,416 and 61/562,420, both filed on Nov. 21, 2011 and titled "MOTOR-DRIVEN CURTAIN OR BLIND ASSEMBLY," the entire contents of which are hereby incorporated herein by reference for all purposes.

TECHNICAL FIELD

Various embodiments of the present invention generally relate to a curtain or blind assembly. In particular, some embodiments of the present invention relate to systems and methods for a motor-driven curtain or blind assembly.

BACKGROUND

Window coverings can be used to cover a window and/or a portion of a wall. In many cases, window coverings can be used for managing sunlight, creating privacy, or other functional purposes. In addition to these functional uses, window coverings can provide a variety of decorative features to enhance the enjoyment of the space. Common examples of window coverings include drapes, curtains, blinds, and others. Some window coverings include automated systems to aid an individual in opening and closing.

Traditional automated curtain tracks, for example, can use either a belt and pulley or rack and pinion system to move the curtain runners. Both systems typically use a conventional AC or DC motor to drive the systems. The result is a bulky motor(s) at the end(s) of the track. Thus, when using a light curtain fabric or when no curtain is in place, this bulky motor is in plain sight and can be quite unsightly. Furthermore, due to the nature of traditional designs, these systems can produce audible sounds when they are in action. These sounds can originate from the motor as well as the drive system. Both the noise and unsightly placement of the motor can detract from many of the benefits that the automated systems provided. As such, there are a number of challenges and inefficiencies found in traditional curtain and blind assemblies.

SUMMARY

Systems and methods are described for motor-driven curtain or blind assembly. In some embodiments, an assembly can include a track, a lead runner, and a plurality of sensors. The track can have a plurality of coils that can be electrically activated to generate an electromagnetic field to cause the lead runner to slide along the track. The lead runner may include magnet housing with a magnet to interact with the electromagnetic field. In some embodiments, the plurality of sensors or switches can be disposed between the plurality of coils. The sensors can be configured to activate the electromagnetic field locally to cause the lead runner to slide along the track. Examples of the sensors or switches include, but are not limited to, a reed switch, a silicone magnetic switch, an optical switch, a mechanical limit switch, a proximity switch, a strip of potential meter, a magnetic encoder, or an optical encoder.

In some embodiments, a carrier assembly can be coupled to the magnet housing and/or lead runner. The carrier assembly can include one or more openings that allow a curtain to be attached. In some cases, the assembly can include a solar panel fitted to the side of the track allowing for solar energy to be harvested through a window.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
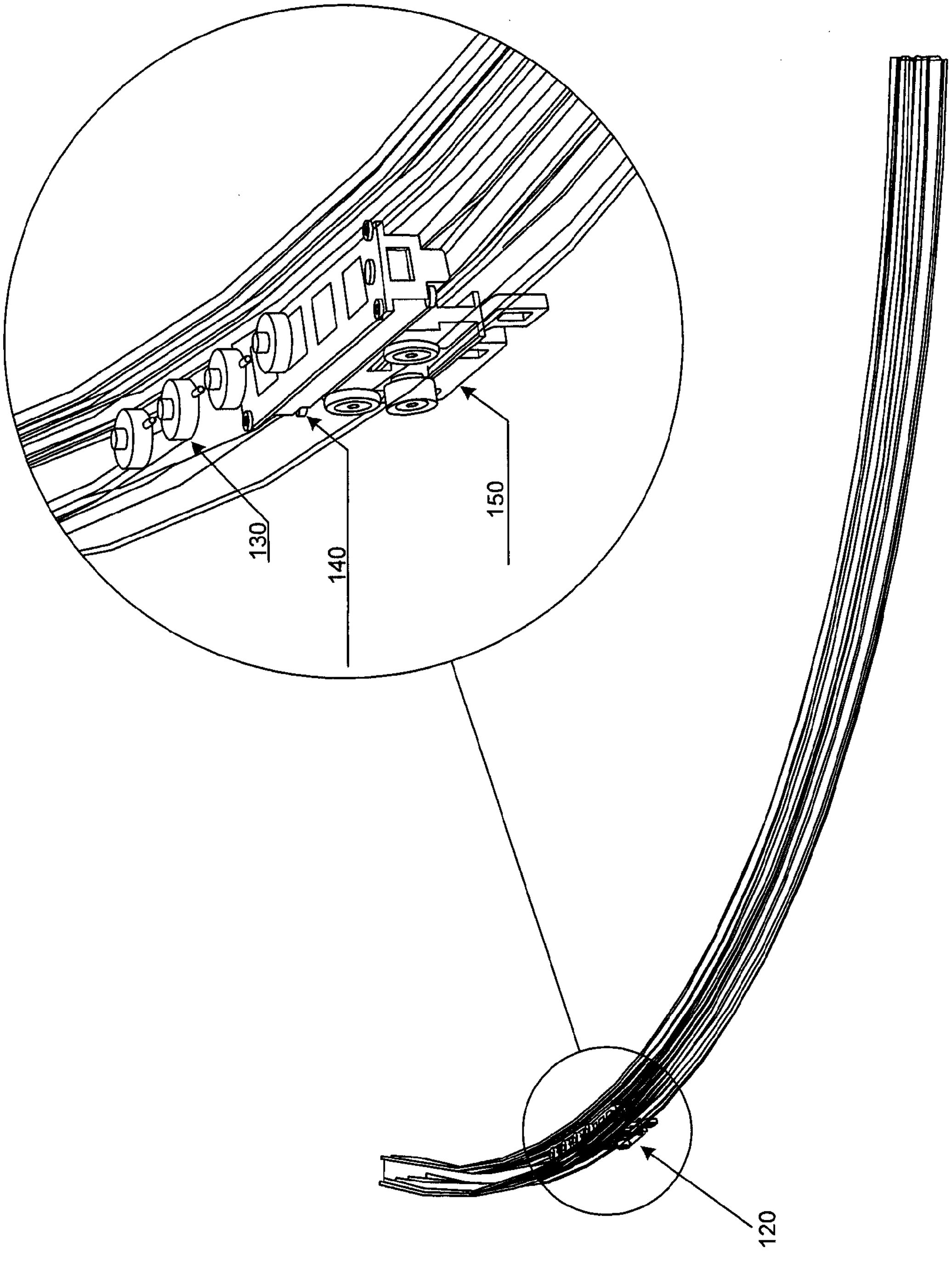
FIG. 1 is an example of a curved track on which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Traditional automated curtain tracks use either a belt and pulley or rack and pinion system to move the curtain runners. Both systems typically use a conventional AC or DC motor to drive the systems. The result is a bulky motor(s) at the end(s) of the track. Thus, when using a light curtain fabric or when no curtain is in place, this bulky motor is in plain sight and can be quite unsightly. Furthermore, due to the nature of the design, these traditional systems can produce audible sounds when the drive system is activated. These sounds mainly come from the motor and the drive system.

In contrast, various embodiments of the present invention provide for systems and methods for an improved motor-driven curtain or blind assembly. Various embodiments of the present invention use a motor track (e.g., a linear motor track) with a linear motor system to eliminate the bulky motor and their respective drive systems. A linear motor is a non-contact drive system. As such, various embodiments can be extremely quiet and can eliminate the bulky motor at the end of the curtain track. In addition, with a linear motor system, there is no need for the belt and pulley and the rack and pinion transfer systems. As a result, the track used in various embodiments of the present invention could be implemented without length limitation. In accordance with various embodiments of the present invention, the track can be made from a combination of one or more materials such as, but not limited to, Aluminum, HS15 (which is an unfilled POM material), C9021 GV1/30 (which is a 26% glass filled material), or XT 20.

The techniques introduced here can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

For convenience, embodiments of the present invention are described with reference to motor-driven curtain or blind assemblies that may be remotely controlled by a mobile device, a smart phone, or other computing platform. Various embodiments are applicable to other operational models and applications where moving a runner from one end of a track to another may be useful such as opening doors, cabinets, drawers, and/or moving various other objects. In addition, the features of many embodiments may be accessed by users using a software package or hardware device (with associated software or firmware) which may be directly installed on or connected to an end user's computer or mobile device. In some cases, access to the software and/or hardware device may be provided through various communication connections such as the Internet.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in one embodiment," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "responsive," "in response," and other variants include completely and partially responsive.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

FIG. 1 is an example of a curved motor track 110 with a lead runner 120 that can be used in accordance with some embodiments of the present invention. While FIG. 1 illustrates a curved motor track, other embodiments of the present invention can be used in conjunction with a linear track and/or a track with both linear and curved portions. As illustrated in FIG. 1, motor track 110 can include a series of coils 130 (e.g., copper coils) that are fixed along the track. When activated, these coils 130 can be electrically charged (DC) to generate an electromagnetic field. In some embodiments, lead runner 120 can include a set of permanent magnets. In addition, some embodiments of lead runner 120 include a side guiding wheel that can be used to guide the lead runner along motor track 110. In addition, a carrier 150 can be attached to lead runner 120. The lead runner 120 can include one or more openings for attaching other objects (e.g., curtains).

As the electromagnetic field is being generated from coils 130, the repelling force between this electromagnetic field and the magnetic field from the permanent magnet propels lead runner 120 forward or backward along motor track 110 depending on the polarity of this electromagnetic field. In some embodiments, coils 130 can be made of copper and may be placed in sets of two. The sets of two coils can be placed side by side. They can be electrically connected with different polarities in order to create alternating North and South poles simultaneously. This would act as a switching process between North and South polarities.

Figure 2A:
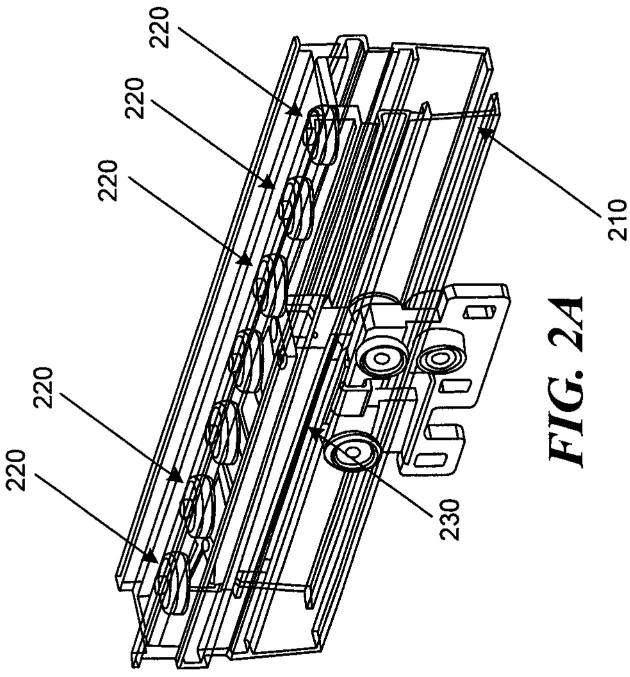
FIGS. 2A-2D illustrate various views of exemplary components of a motor-driven curtain or blind assembly according to one or more embodiments of the present invention.
Figure 2B:
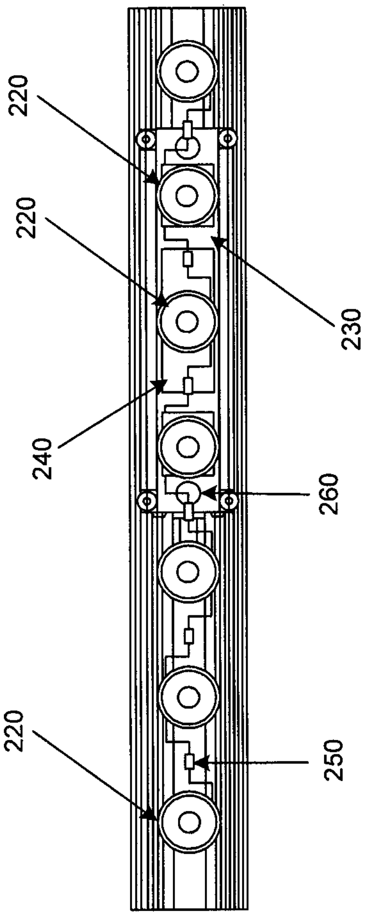
Figure 2C:
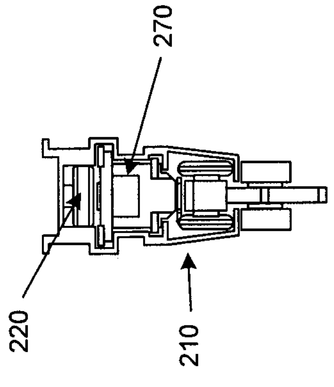
Figure 2D:
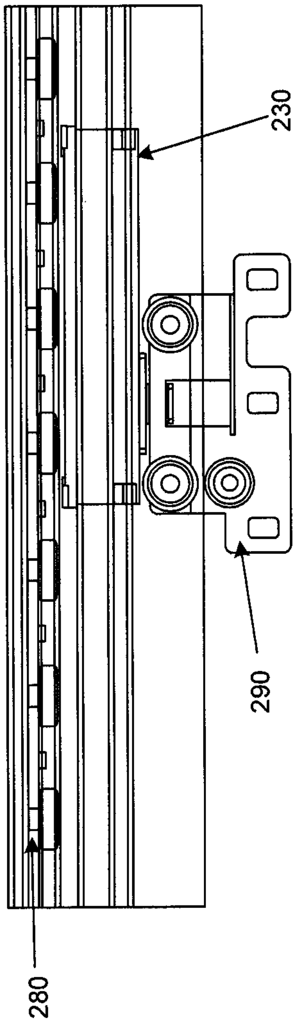

FIGS. 2A-2D illustrate various views of exemplary components of a motor-driven assembly according to one or more embodiments of the present invention. FIG. 2A is a perspective view of the motor-driven assembly with track 210 having coils 220 affixed and lead runner 230 configured to slide along the track. FIG. 2B shows a top view with lead runner 230 having a permanent magnet 240. In the embodiments shown, between coils 220 are switches 250 (e.g., reed switches) and sensor 260 (e.g., hall sensors). In some cases, the sensors can be used for activating an electromagnetic field causing lead runner 230 to slide in a desired direction. FIG. 2C shows a cross-sectional view of the motor-driven assembly where lead runner 230 includes magnetic housing 270 for housing magnet 240. In the longitudinal view illustrated in FIG. 2D, track 210 and coils 220 are attached with coil holders 280.

Various embodiments provide for a variety of power sources and the elimination of heat in order allow for much greater (almost unlimited) track length. In some embodiments, switches 250 can be placed in between each coil 220. Examples of the types of switches that can be used to active the coil include, but are not limited to, reed switches, silicone magnetic switches, optical switches, mechanical limit switches, proximity switches, magnetic encoders, optical encoders, and others. In some embodiments, the power supply to the coil is "open" and no power is being fed to the coil. In these cases, power to the coil only exists when the permanent magnet runner is directly below it as the magnet field would target the switches (e.g., reed switches) to "Close" the contact and allow power to follow to these coils.

Figure 3:
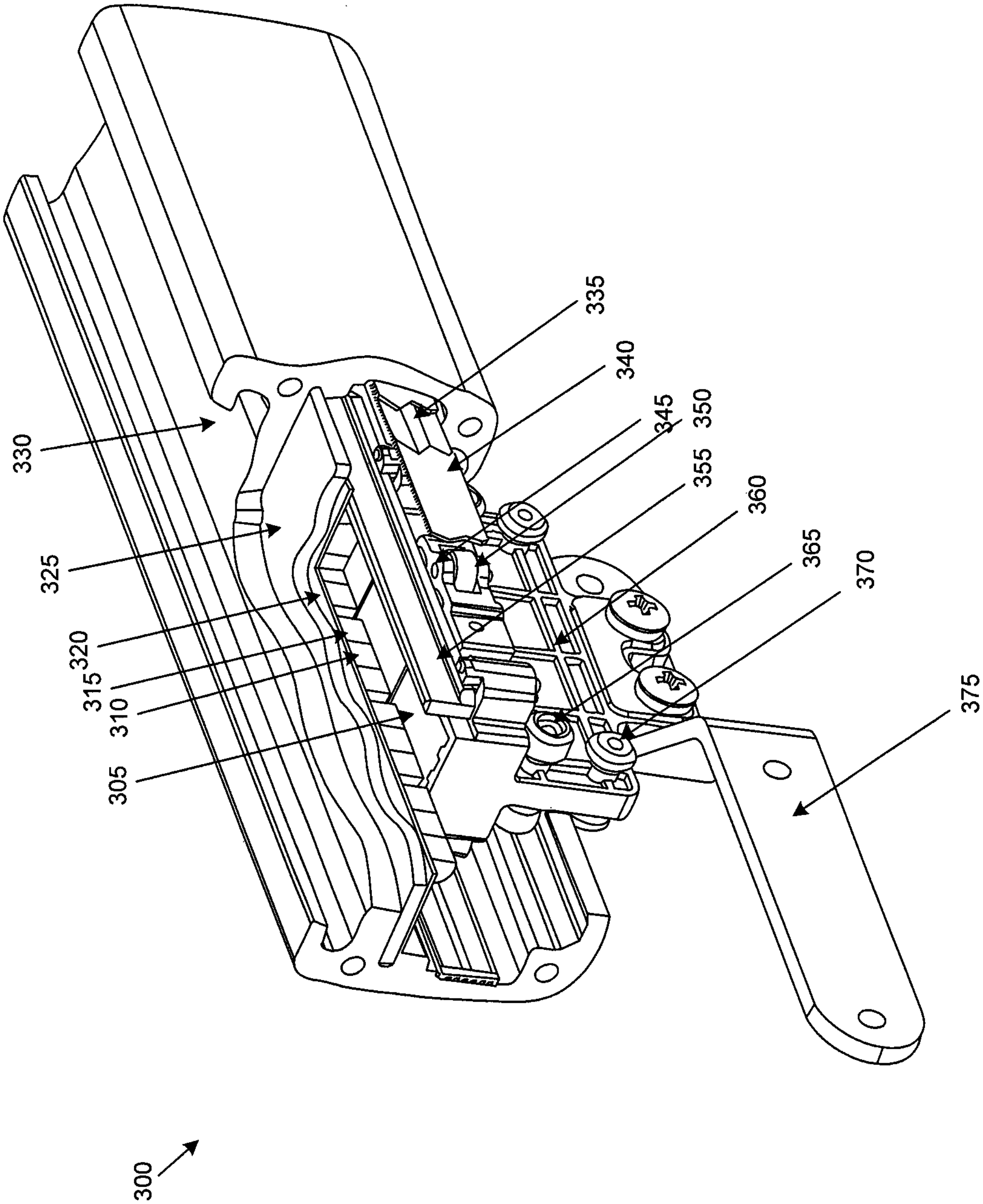
FIG. 3 illustrates a partial cutaway of a motor-driven curtain or blind assembly in accordance with some embodiments of the present invention.
Figure 4:
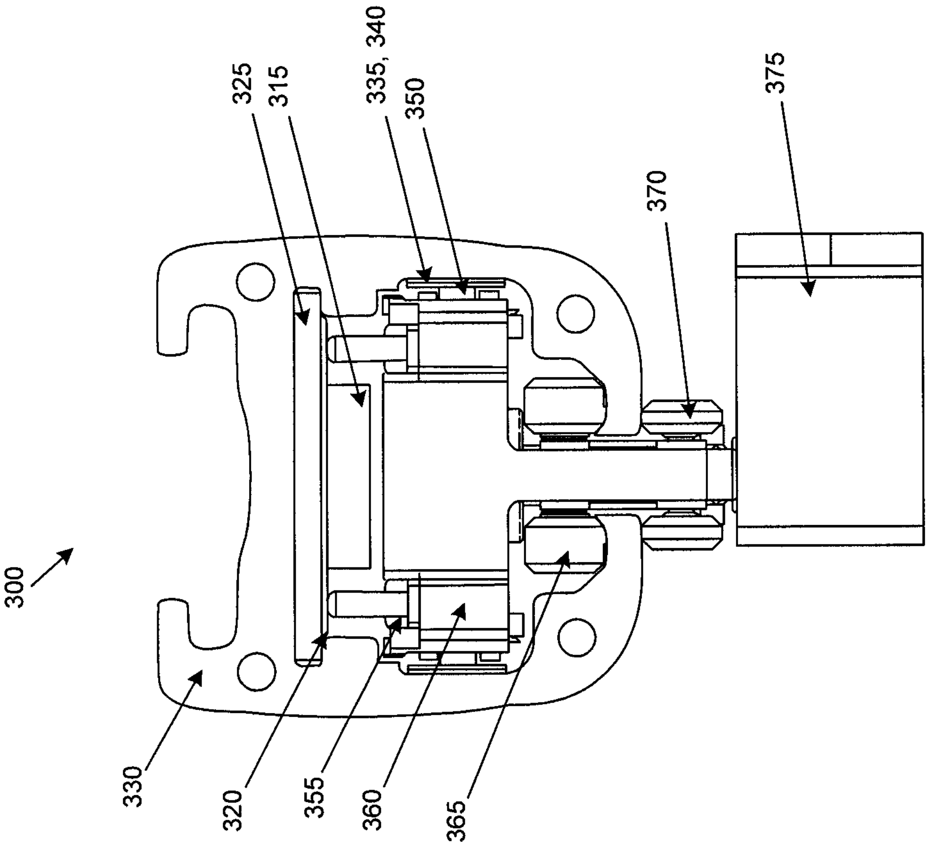
FIG. 4 illustrates a cross sectional view of a motor-driven curtain or blind assembly in accordance with various embodiments of the present invention.

FIG. 3 illustrates a partial cutaway of a perspective view of assembly 300 in accordance with some embodiments of the present invention. FIG. 4 illustrates a cross sectional view of assembly 300. In the embodiments illustrated in FIG. 3 and FIG. 4, the assembly includes magnet 305, iron core 310, coil 315, coil carrier 320, iron strip 325, plastic track 330, bus bar 335, self adhesive 340, copper pin 345, copper bushing 350, copper lifter 355, main housing 360, upper guiding wheel 365, lower guiding wheel 370, and curtain carrier 375. Other embodiments of the present invention may include some, all, or variations of the components shown. For example, some embodiment may include iron strip 325 while other embodiments do not include iron strip 325. One advantage of including iron strip 325 is that with this strip, the electromagnet force may be increased by about 40%. As a result, the size of the coils can be reduced. Another advantage of embodiments that include iron strip 325 is the ease of assembly when inserting the coil assembly into the track since the coils can be attached to iron strip 325.

Figures 5A, 5B:
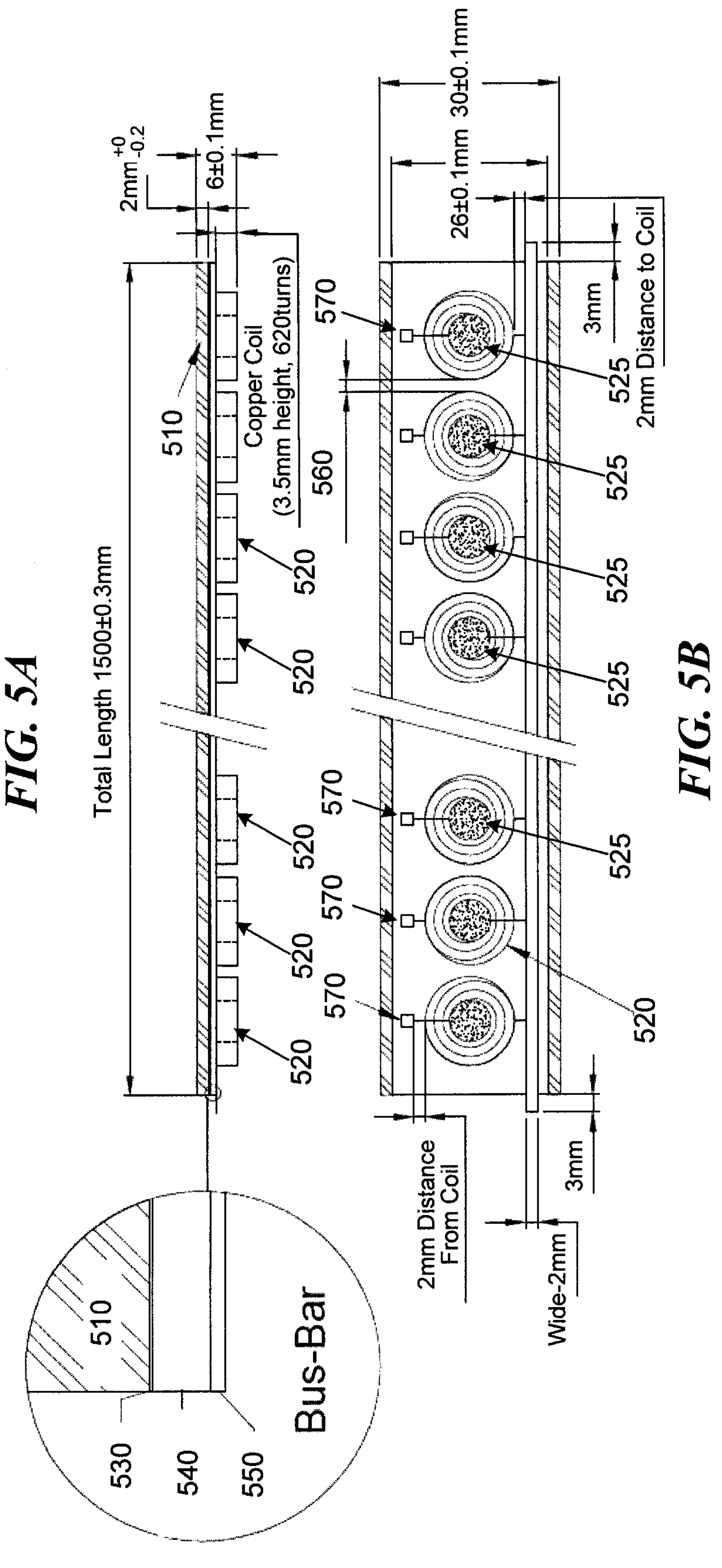
FIGS. 5A-5B show a side and bottom view of the coil construction interacting with a single bus bar and a potential meter strip in accordance with one or more embodiments of the present invention.
Figure 6:
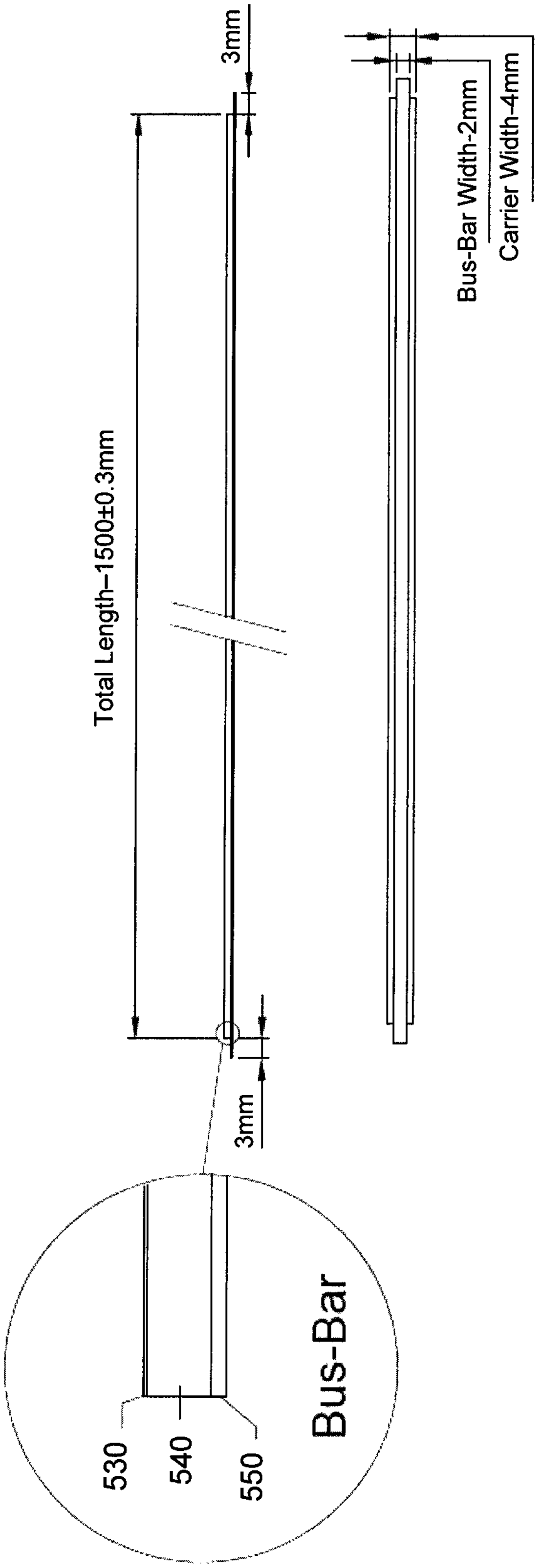
FIG. 6 illustrates one possible bus-bar construction in accordance with various embodiments of the present invention.

FIGS. 5A-5B show a side view and a bottom view of the coil construction interacting with a single bus bar (e.g., as shown in FIG. 3) while FIG. 6 shows one possible bus-bar construction. In these embodiments, the position of the lead runner can be determined through the use of a potentiometer (not shown). FIGS. 5A-5B show a ferrite strip 510, coils 520, a self-adhesive 530, a bus-bar carrier (electrical insulator) 540, and a bus bar 550.

In one or more embodiments, ferrite strip 510 can be approximately 30 mm wide and 2 mm thick. Copper coils 520 can have a height of approximately 3.5 mm, an outer diameter of approximately 15 mm, a wire diameter of about 0.15 mm with a ferrite core 525 having a diameter of about 7 mm. In some embodiments, copper coil 520 can include up to 620 turns or more. Coil gap 560 can be a fixed gap between each coil in some designs. For example, in various embodiments coil gap 560 can be approximately 2 mm. Self-adhesive 530 can have a thickness of approximately 0.1-0.2 mm in one or more embodiments. Bus-bar carrier 540 can have a thickness of about 0.3 mm and bus-bar 550 can have a thickness of about 0.04 mm in various embodiments. In addition, bus plate 570 can have a 2×2 mm or greater surface in some embodiments. These dimensions are just examples of the dimensions that can be used in some embodiments. The dimensions can be different in other embodiments and may depend on a variety of factors including the configuration of the assembly, materials used, performance specifications, power specifications, and/or other design considerations.

Figure 7:
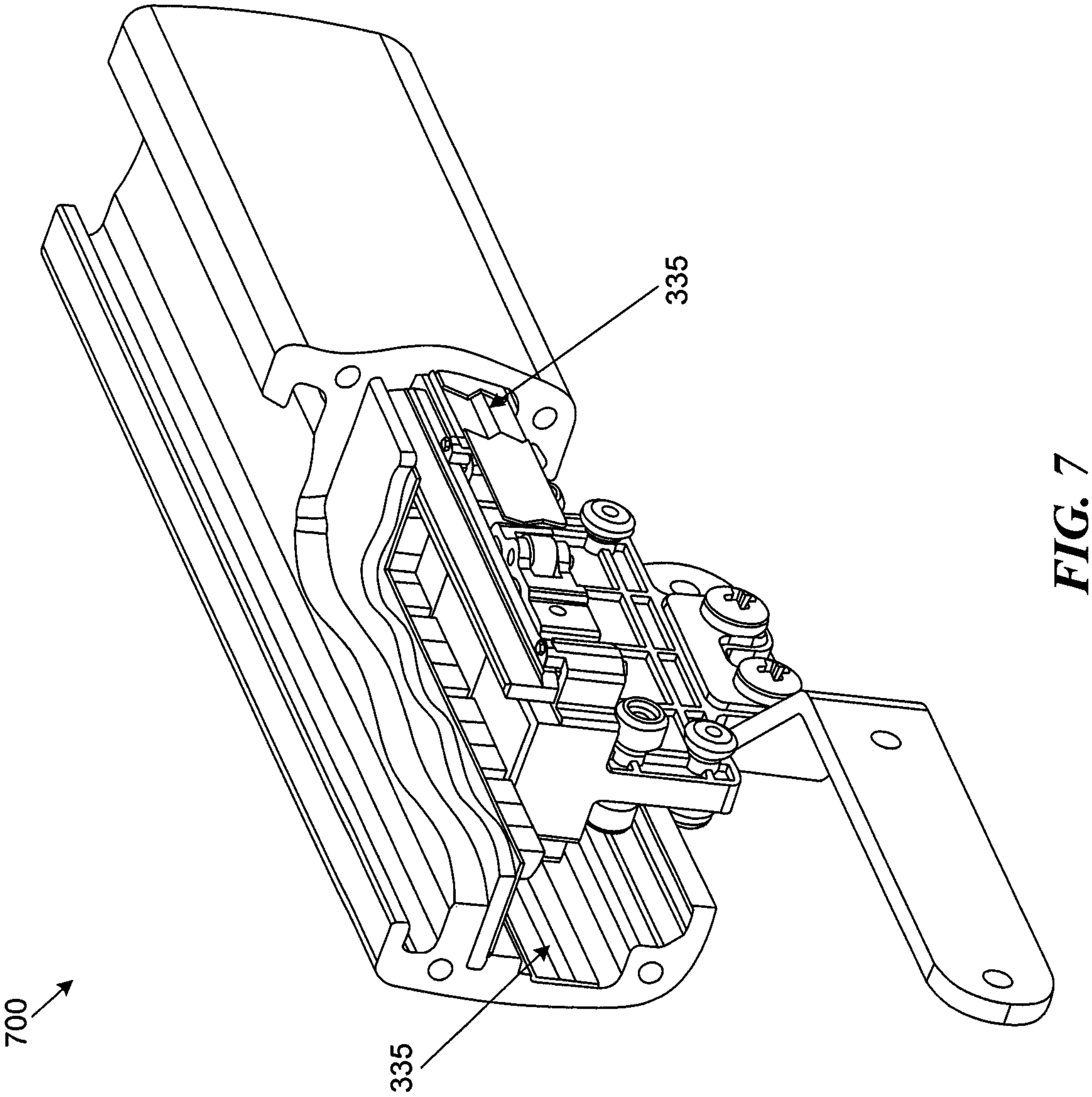
FIG. 7 illustrates a partial cutaway of a perspective view of a motor-driven curtain or blind assembly according to some embodiments of the present invention.
Figures 8A, 8B:
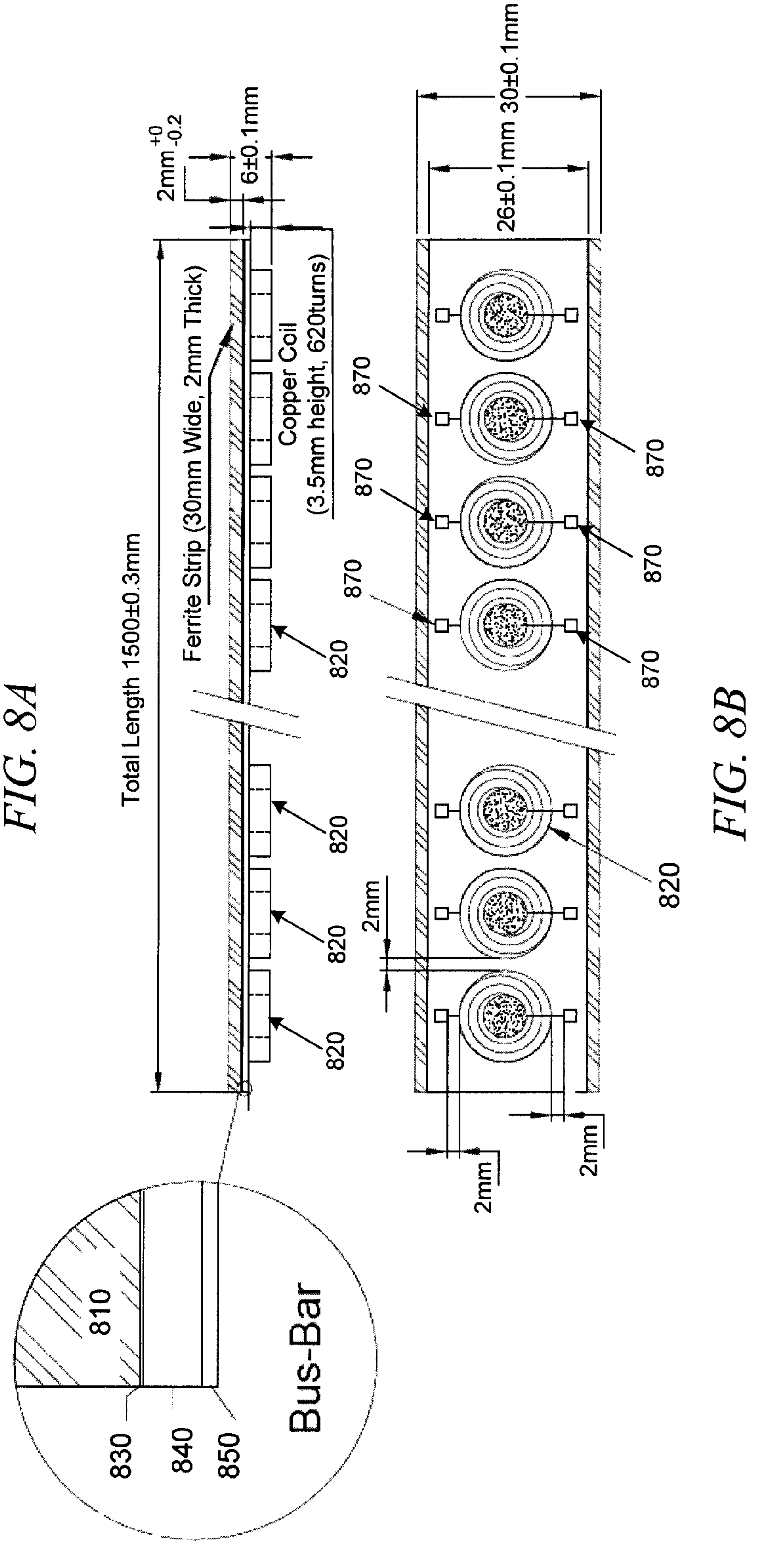
FIGS. 8A-8B show a side and bottom view of the coil construction interacting with a dual bus bar construction in accordance with one or more embodiments of the present invention.
Figure 9:
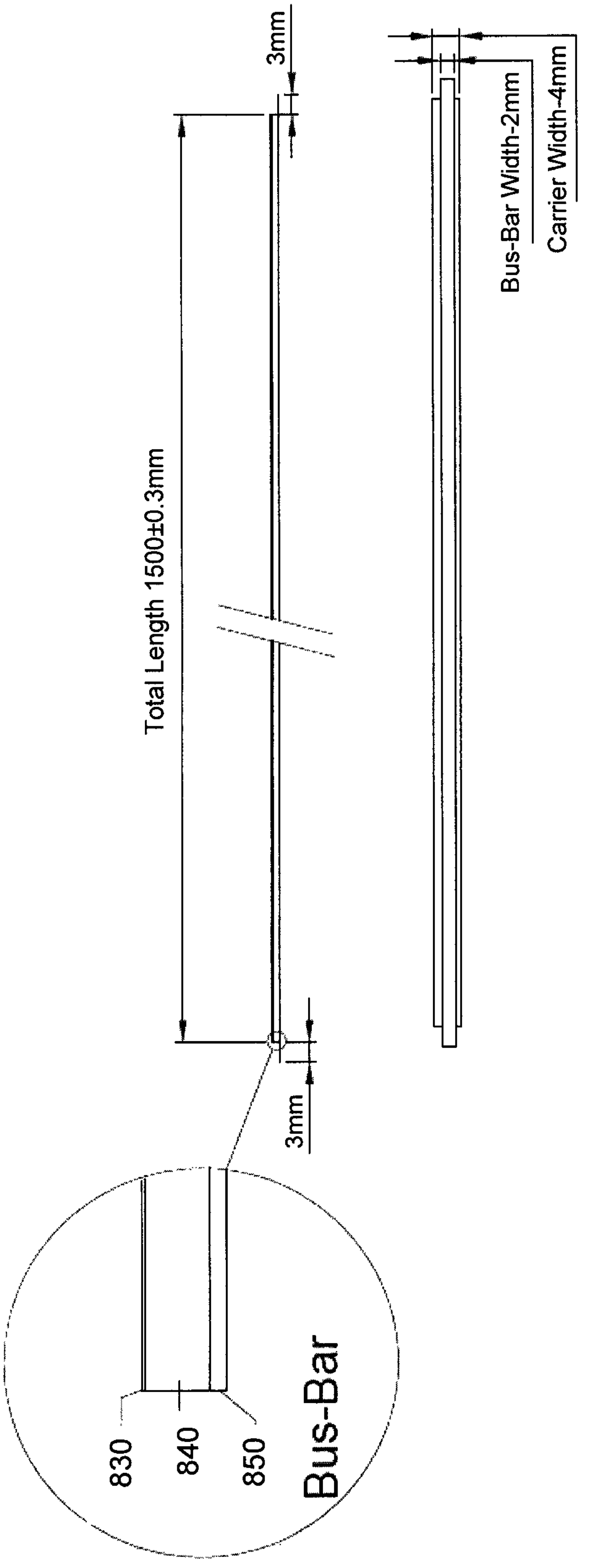
FIG. 9 illustrates a bus-bar construction in accordance with various embodiments of the present invention.

FIG. 7 illustrates a partial cutaway of a perspective view of assembly 700 in accordance with one or more embodiments of the present invention. Assembly 700 illustrated in FIG. 7 is similar to the one shown in FIG. 3. However, in the embodiments shown in FIG. 7, there are two bus bars 335 (i.e., one bus bar is located on each side of the track). FIGS. 8A-8B show a side view and a bottom view of the coil construction interacting with two bus bars (e.g., as shown in FIG. 7) while FIG. 9 shows one possible bus-bar construction.

FIGS. 8A-8B show a ferrite strip 810, coils 820, a self-adhesive 830, a bus-bar carrier (electrical insulator) 840, and a bus bar 850. Each coil 820 is associated with two bus plates 870. The position of the lead runner can be determined by the coil configuration when two bus bars are present. FIG. 9 shows a bus bar configuration that can be used in connection with the embodiments shown in FIGS. 8A-8B.

Figure 10:
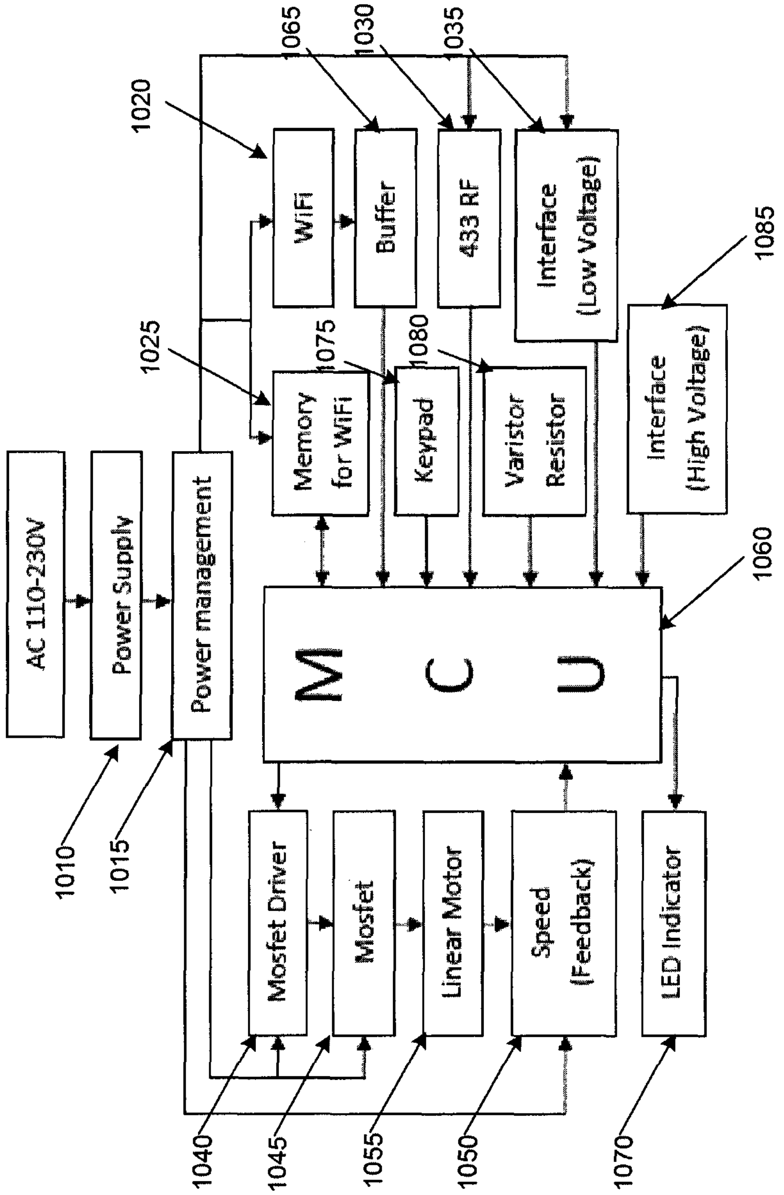
FIG. 10 is a block diagram illustrating an exemplary set of components for operating a motor-driven curtain or blind assembly in accordance with one or more embodiments of the present invention.

FIG. 10 is a block diagram illustrating an exemplary set of components for operating a motor-driven assembly in accordance with one or more embodiments of the present invention. As illustrated in the embodiments shown in FIG. 10, 110-230 volts AC can be used to provide power to power supply module 1010 which may convert the AC voltage to a DC voltage. In accordance with various embodiments of the present invention different power sources can be used to power the assembly.

For example, in some cases, a battery can be used. In other embodiments, a solar power can be used to collect energy from outside and/or inside light. For example, a solar power film can be applied to the window to collect the light and then converted to power to the assembly. The solar panel can run along the length of the track in some embodiments or can be a separate panel (e.g., located outside of a building). A rechargeable battery can be charged using the power generated from the solar panels or thin film. In other embodiments DC power can be supplied from other sources.

Power management module 1015 can monitor the status of each of the power supplies and switch between multiple power sources. In addition power management module 1015 can determine whether power should be provided to WiFi transceiver module 1020, WiFi memory 1025, RF receiver module 1030, voltage interface module 1035, mosfet driver 1040, and mosfets 1045. In addition, the amount of power supplied by power management module 1015 can be adjusted to control the speed or velocity of the lead runner using a real-time feedback loop implemented by speed module 1050. Speed module 1050 can receive measurements or estimate the current velocity, compare the measurement or estimate to a target speed value, and then adjust the strength of the electromagnetic field and/or linear motor 1055 (e.g., using pulse width modulation).

The motor controller 1060 can control the operation of the motor via the switching of DC polarity (e.g., mosfet) to the (copper) coils. In some embodiments, the motor controller can be sized to fit into the linear motor track. The motor controller could be placed along the ends of the track in various embodiments. In addition, some embodiments can include one or more power and signal boosters at selected intervals to ensure constant power and good signal reception over the protracted length of the track.

The motor controller can include different modules and/or components for receiving remote control signals. For example, an RF receiver 1030 that communicates with an in-house remote controller can be used in some embodiments. Another example is a WiFi transceiver 1020 that works with any smart phone, tablet, or computer. The latter can be a closed-loop system that displays the status of Linear Motor Curtain on the smart phone, tablet, or computer. The commands or communication messages receive via WiFi transceiver 1020 can be buffered in buffer 1065 before being sent to motor control unit 1060. In some cases, one or more LED indicators 1070 can be associated with motor control unit 1060 to provide a visual indication of status of the drive assembly and/or linear motor.

In some embodiments, a keypad interface 1075 can be used to program motor control unit 1060. In other embodiments, adjustments to the maximum speed can be set using a varistor resistor 1080. Some embodiments provide for a high voltage interface module 1085.

Remote Control

Figure 11:
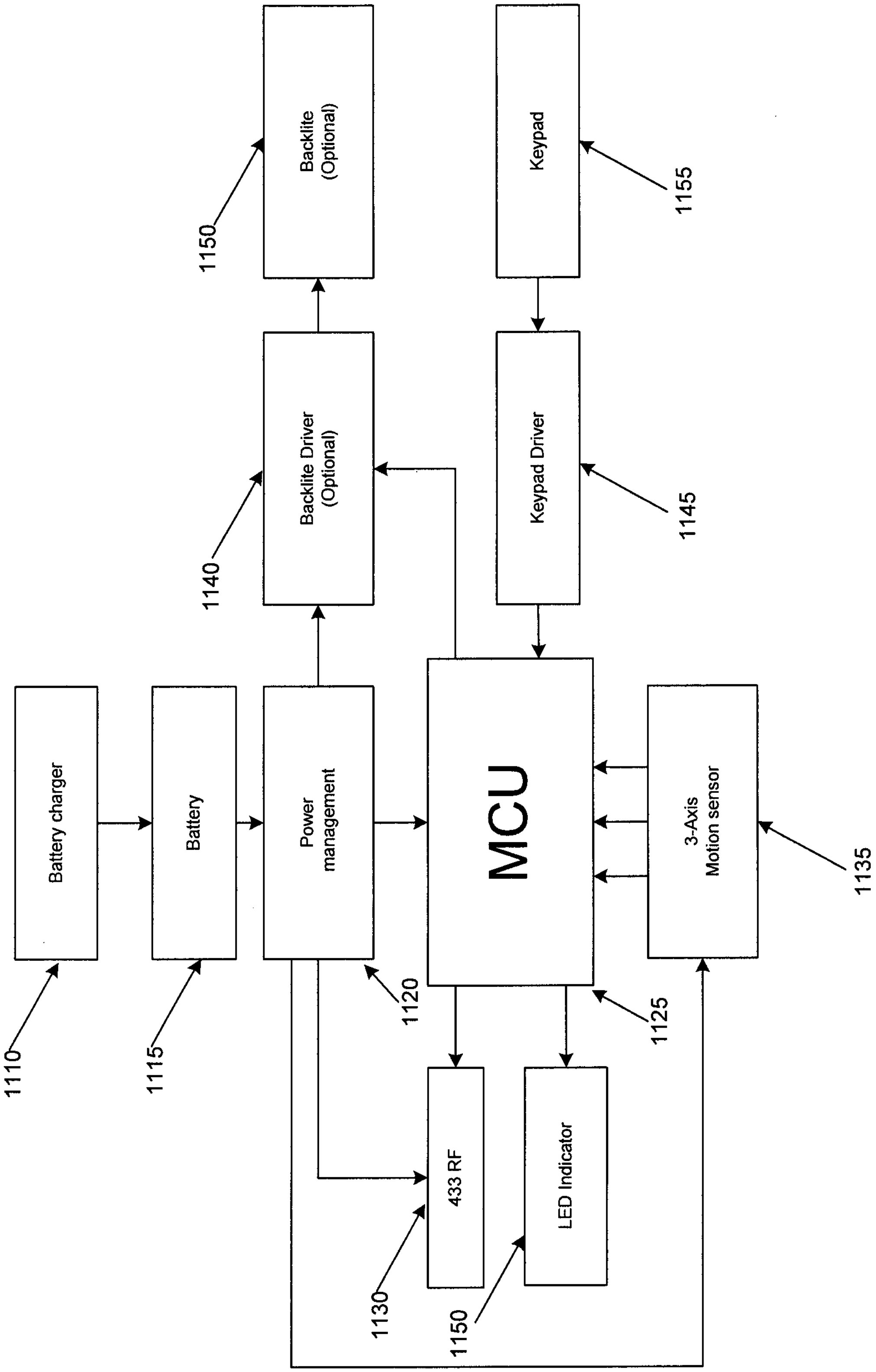
FIG. 11 is a block diagram illustrating an exemplary set of components that can be used for creating a remote control interface in accordance with various embodiments of the present invention.

FIG. 11 is a block diagram illustrating an exemplary set of components that can be used for creating a remote control interface in accordance with various embodiments of the present invention. As illustrated in FIG. 11, some embodiments of the present invention can include a battery charging module 1110 to charge batteries 1115. Power management module 1120 monitors the power available from batteries 1115 and routes power to motor control unit 1125, radio frequency module 1130, motion sensor 1135, backlite driver 1140, and/or keypad driver 1145. Backlite driver 1140 can be used to drive backlites 1150 on the remote control. Keypad driver 1145 can be used to receive commands from keypad 1155. In some embodiments, LED indicators 1160 can be used to provide the status of the motor control unit 1125.

As discussed above, various methods can be used to control the linear motor curtain assembly. For example, in some embodiments, a remote controller (see, e.g., FIGS. 12A-12B) sends a command to the motor controller to perform the requested function. This would be done, for example, via Radio Frequency (RF). The remote controller used in various embodiments includes three portions: 1) the touch sensor user interface, 2) the control board and 3) the casing.

Figure 12B:
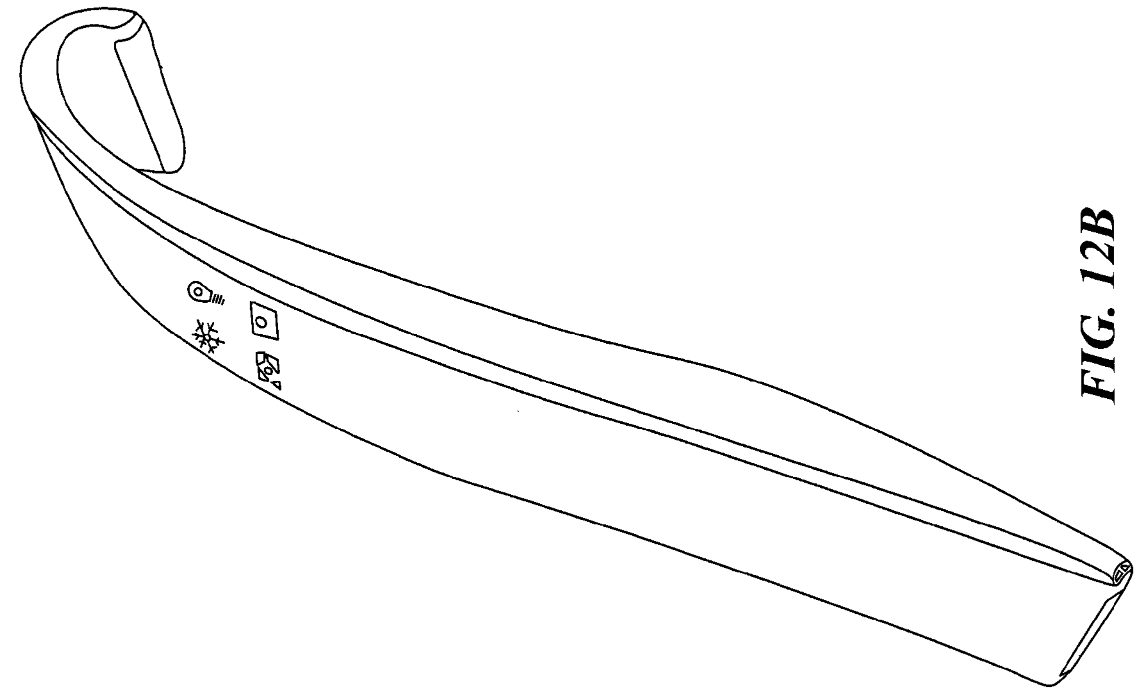
FIGS. 12A-12B illustrate a remote control that can be used in accordance with some embodiments of the present invention.
Figure 12A:
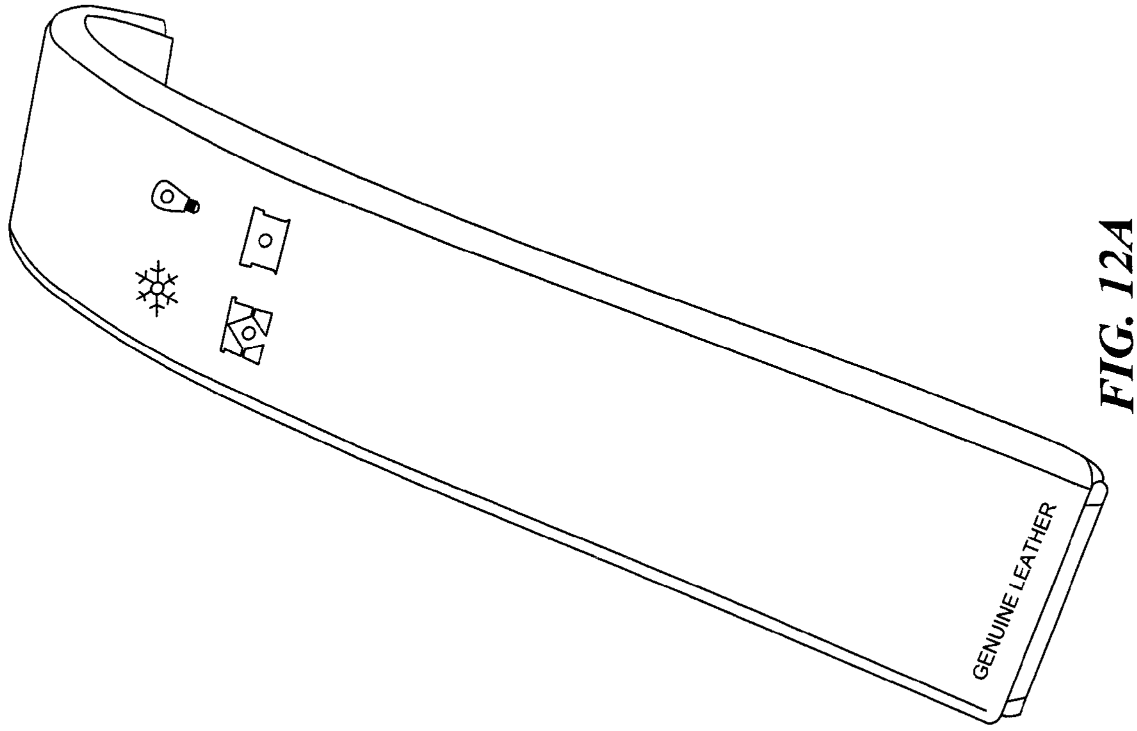

In some embodiments, the remote controller only has four LED backlight menu buttons as illustrated in FIGS. 12A-12B. After selecting the menu, the requested function would be initialed by gesturing the remote controller. That is, moving the remote controller left or right to open or close the curtain(s) and up or down to stop any movement. This gesture technology is made possible, in some embodiments, by utilizing a three axis motion sensor 1135 incorporated in the control board. In some embodiments, due to the nature of the casing, the control would be designed on a flexible printed circuit, and would be as thin as possible.

Various embodiments of the present invention can use a projected capacitive touch sensor which can be laminated onto a film and adhered permanently onto the casing and covered over leather. This film can include the touch Sensor driver and the RF antenna.

The remote controller casing could be made of stainless steel, aluminum, wood or plastic molded with leather warp-around. As leather can be colored, embodiments of the remote control can have various color options (e.g., to allow customers to match the color of the remote control to their curtains). The menu LEDs (one color for each menu icon) can light up through the leather to illuminate the icons for ease of selection in dim/dark room environment.

Smart Phone or Tablet Control

In various embodiments, smart phones or tablets can control the linear motor curtain from anywhere in the world as long as WiFi is available. The linear motor curtain can have a built-in WiFi transceiver that works with any smart phones or tablets. In accordance with some embodiments, the control system is a closed-loop system that displays the status of the linear motor curtain on the smart phone or tablet. No set up box is required as it works over the interne. In order to have this feature, various embodiments allow the end-user to download our web-page (APPs from APPLE or ANDROID, see "Smartphone web-page Interface") user interface into their smart phone and tablet. With these APPs, the user can program every curtain individually by assigning them on the APPs layout. FIGS. 13-17 illustrate a mobile device displaying various graphical user interfaces for setting up and operating a motor-driven assembly in accordance with one or more embodiments of the present invention. The linear motor curtain can also be hard wired to a programmable Logic Controller (PLC) to be controlled as part of the total home automation system.

Figure 13:
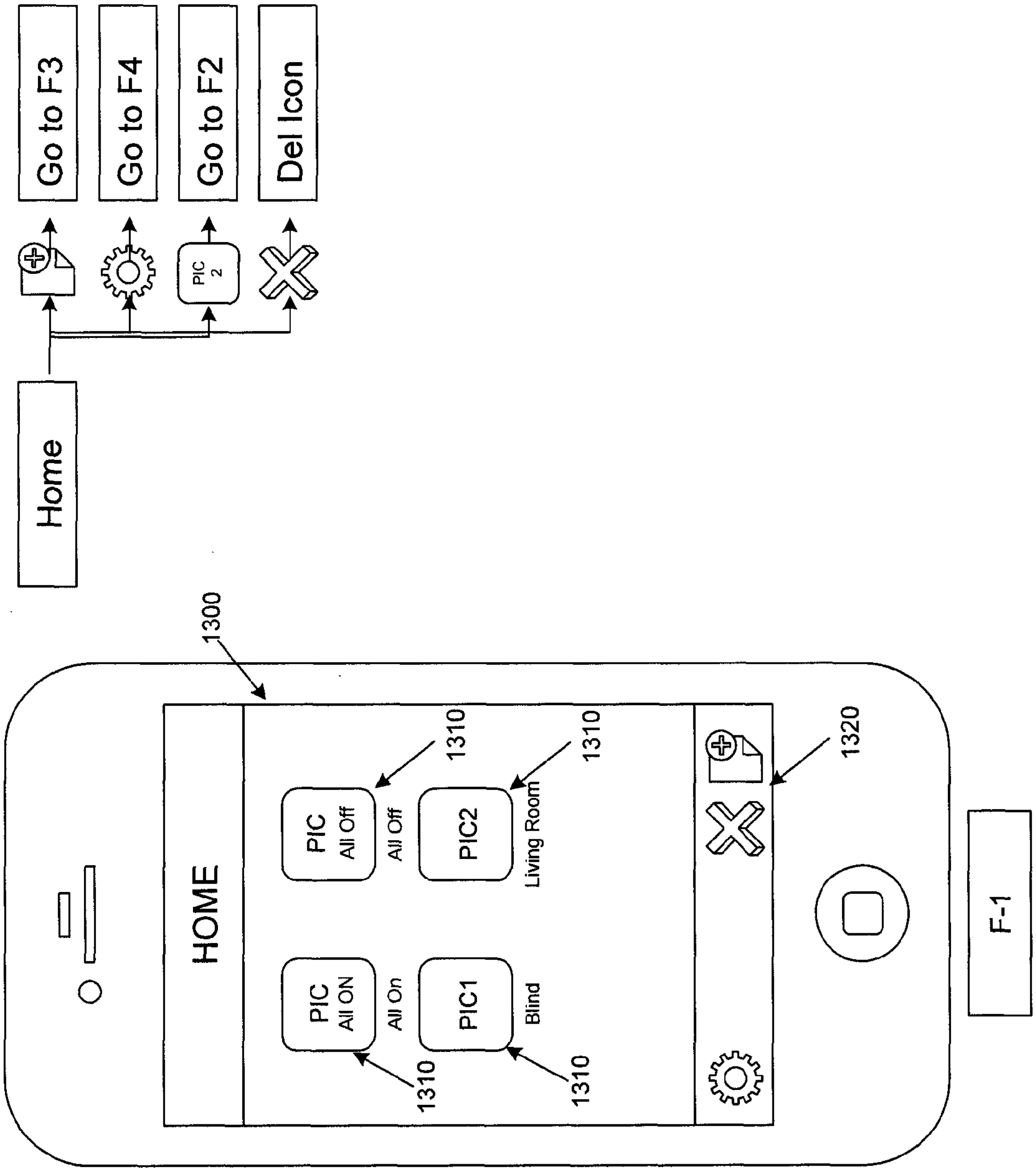
FIGS. 13-17 illustrate a mobile device displaying various graphical user interfaces for setting up and operating a motor-driven curtain or blind assembly in accordance with one or more embodiments of the present invention.
Figure 14:
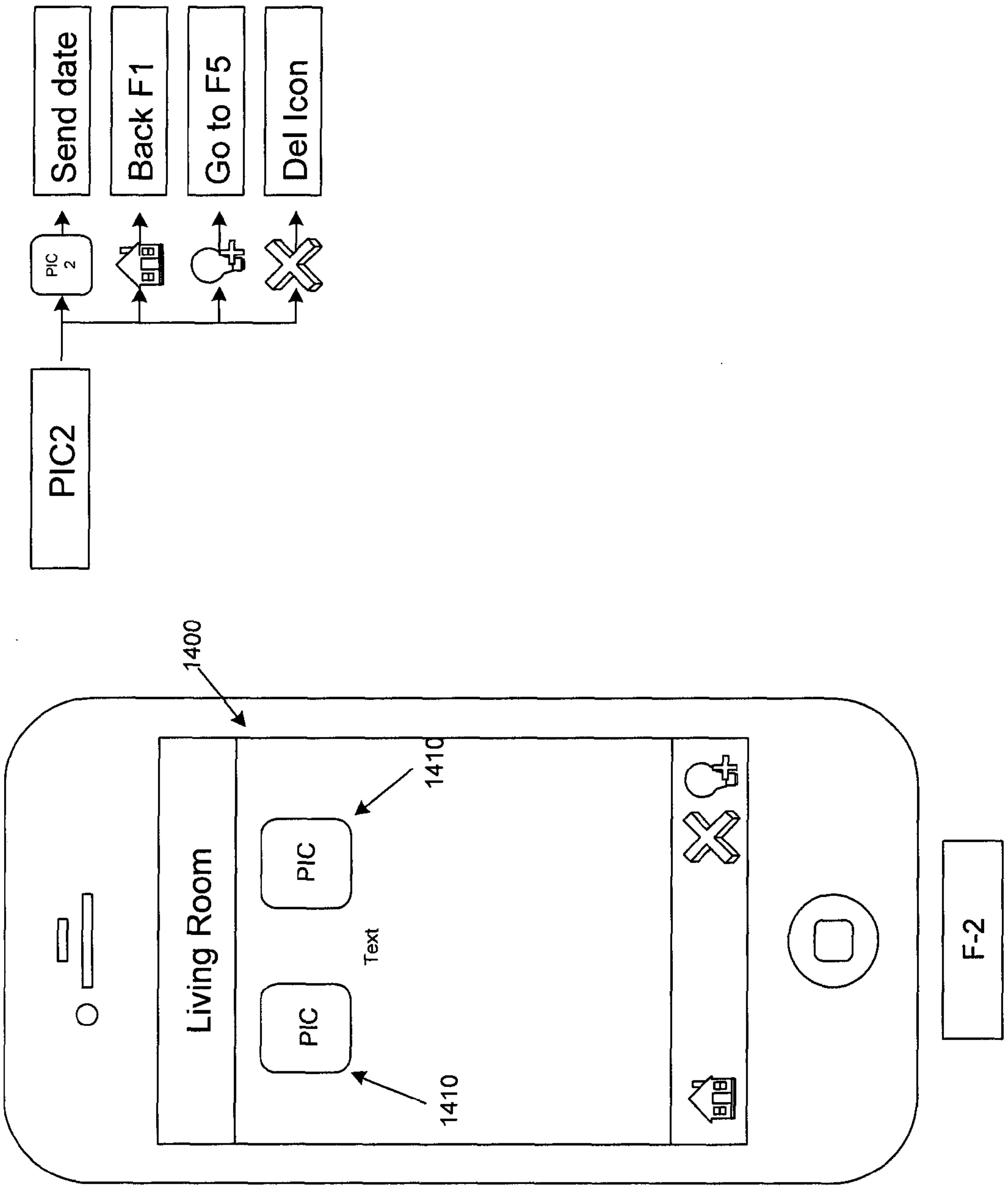

FIG. 13 illustrates an example of a GUI 1300 on a home page. Various pictures 1310 can be used to navigate to various control pages for individual appliances, blinds, rooms, or other specified configurations. For example, upon receiving a user selection to navigate to the living room control page, GUI 1300 is replaced with GUI 1400 shown in FIG. 14. The individual icons 1410 can be used to control items within the living room (e.g., blinds or curtain assemblies). Navigations icons 1320 can be used to navigate to other GUI screens available with various embodiments of the present invention or to delete icons.

Figure 15:
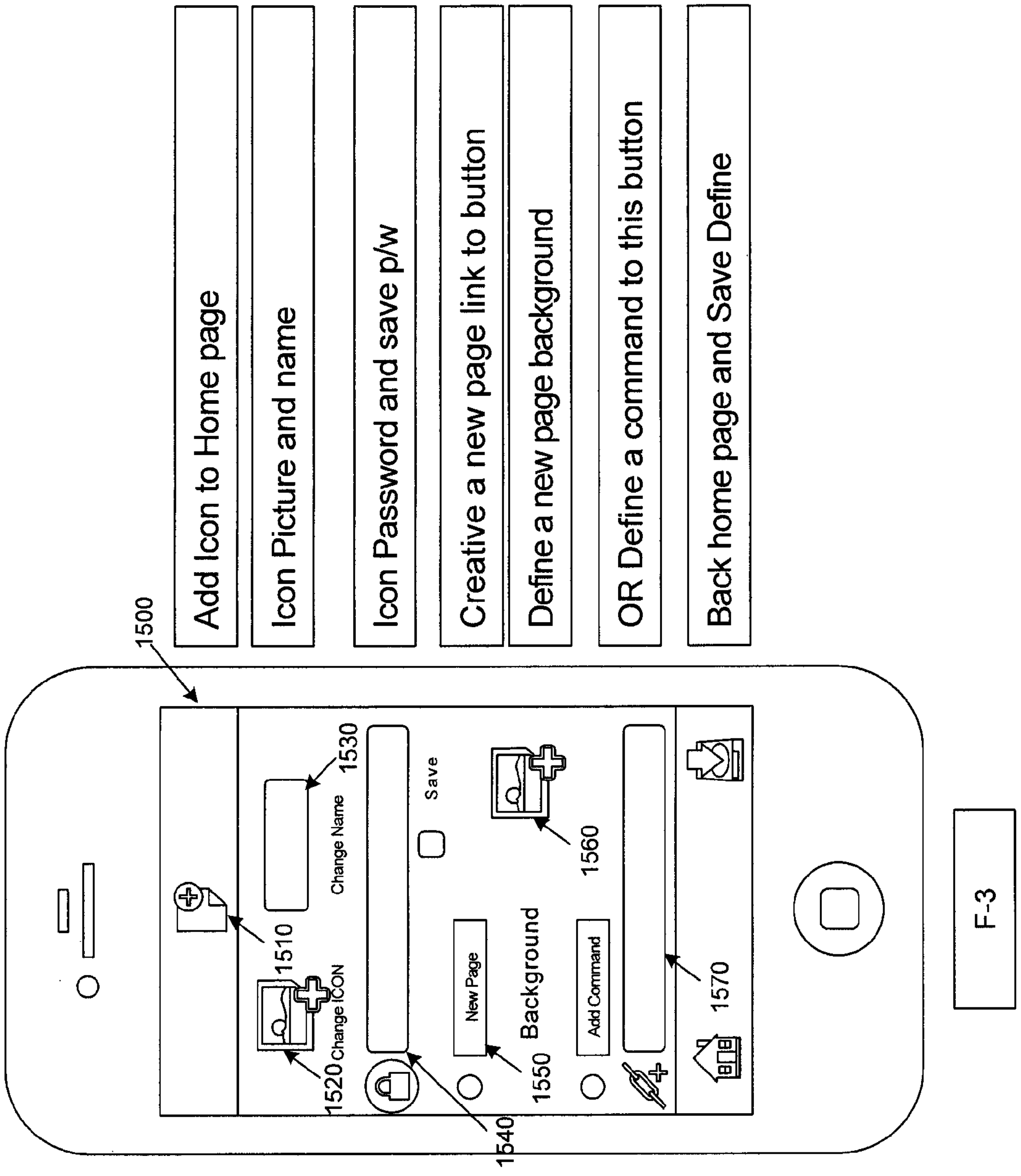
Figure 16:
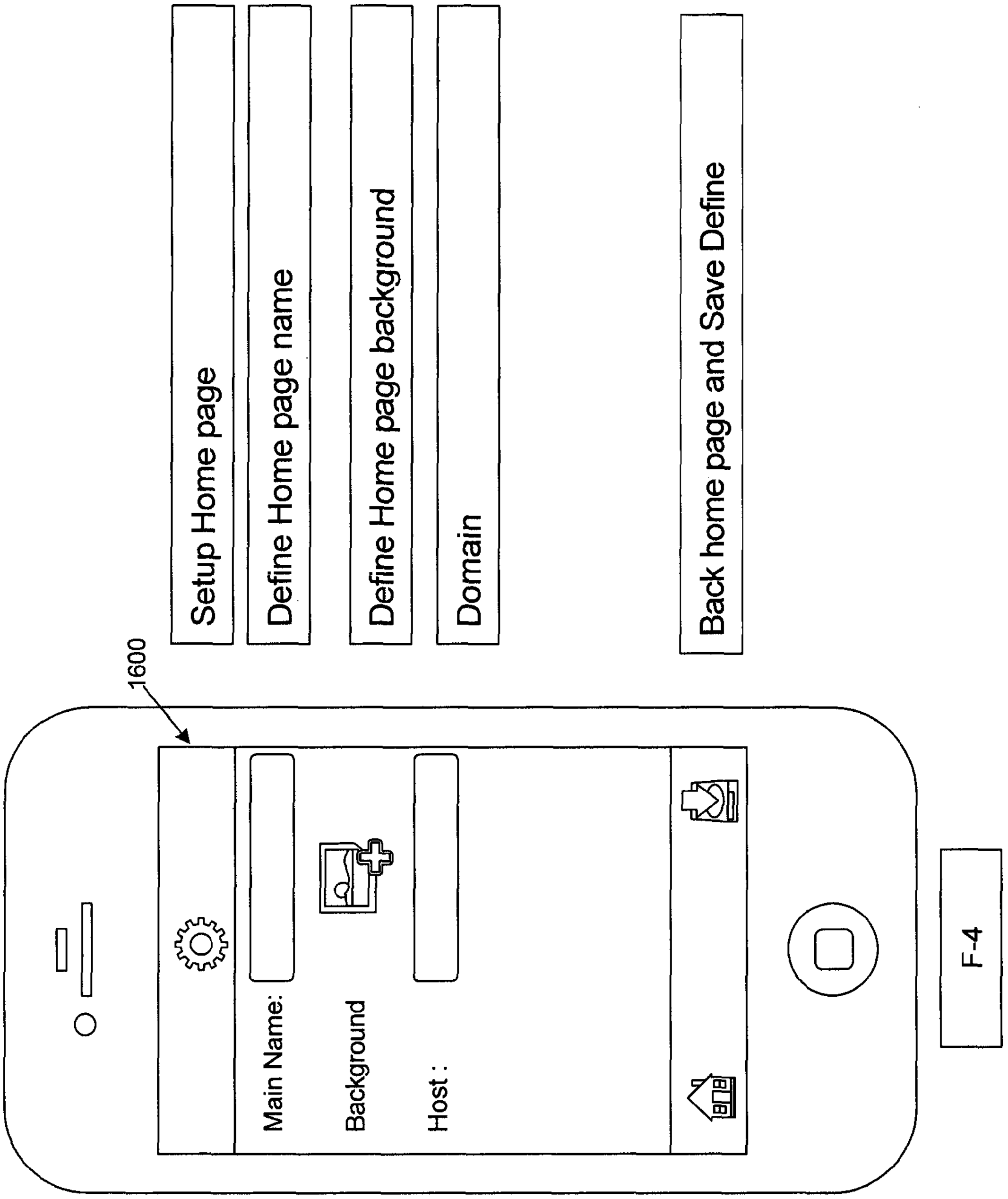
Figure 17:
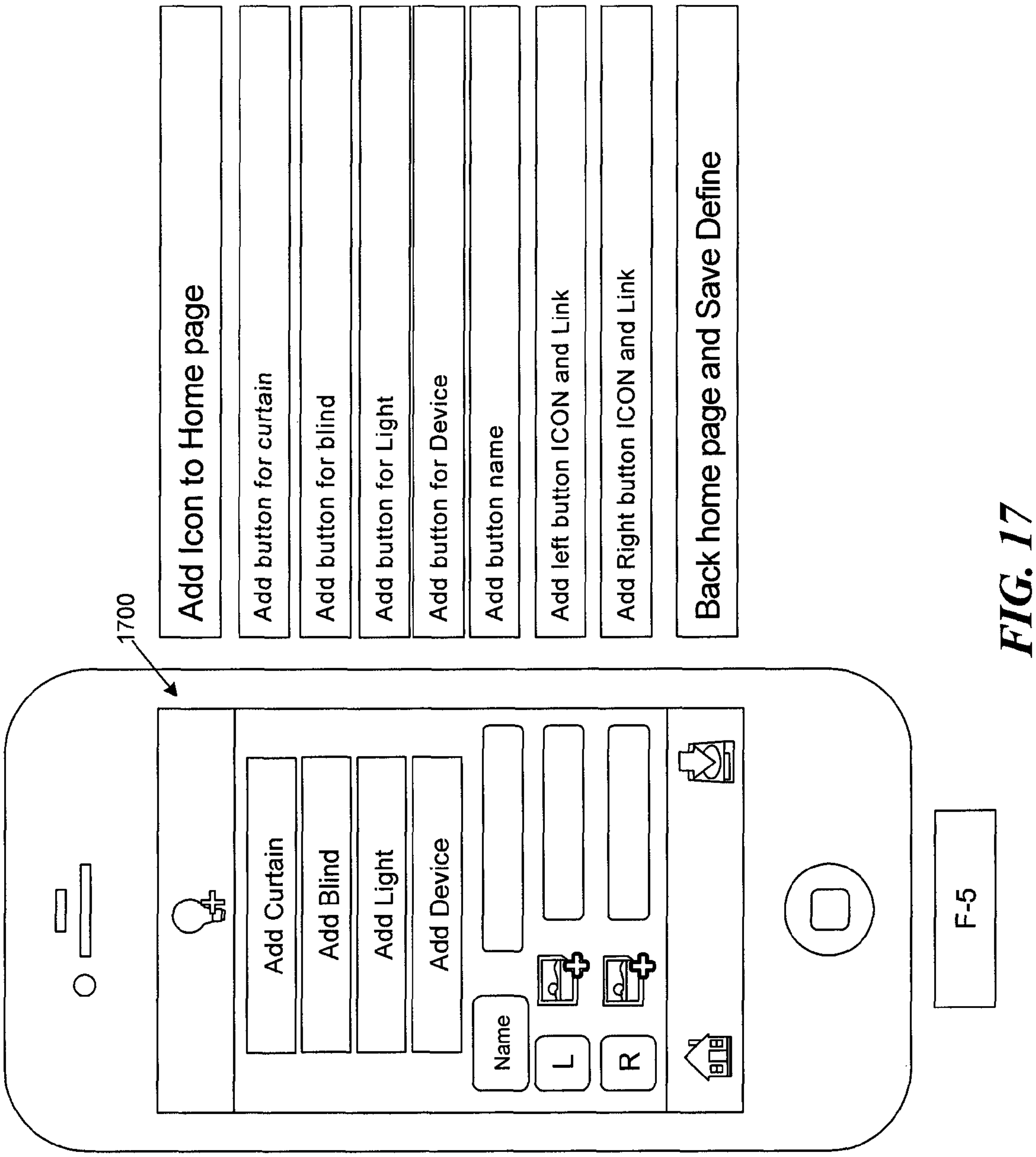

FIG. 15, for example, is one example of a possible GUI screen 1500 that can be used for customizing the home page shown in FIG. 13. As illustrated in FIG. 15 icon 1510 can be used to add an icon to home page 1300. Icons 1520 and 1530 can be used to select or change an icon picture and/or name. In some embodiments, bounding box 1540 can be used to create a password security level. Similarly, icons 1550-1570 can be used to create/associate a new page link to an icon, define a new page background, or add a custom command. FIG. 16 illustrates an example of a GUI screen 1600 that can be used to setup home page 1300. FIG. 17 illustrates an example of a GUI screen 1700 that can be used to add curtains, blinds, lights, or other devices to a profile.

Exemplary Computer System

Figure 18:
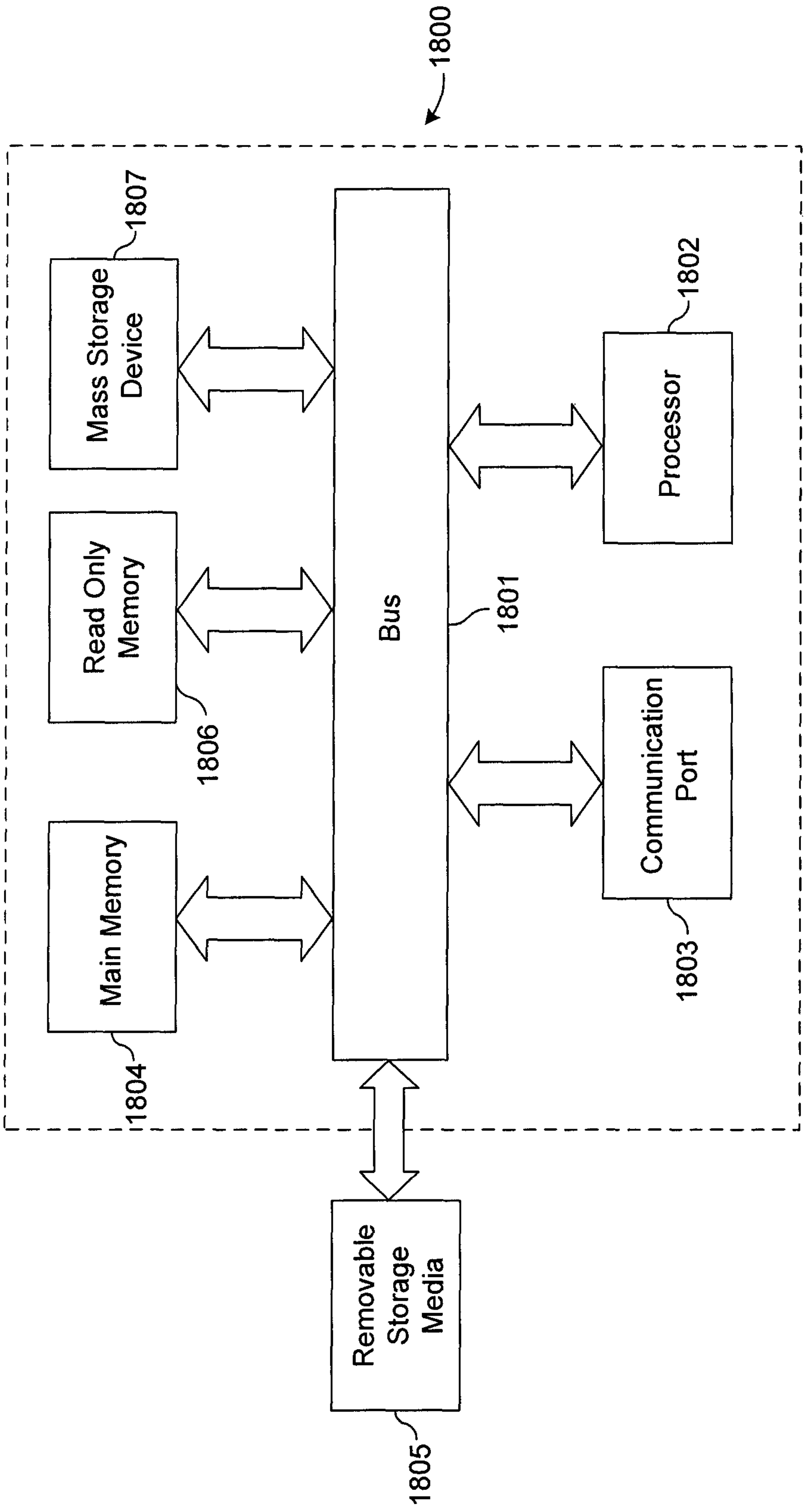
FIG. 18 illustrates an example of a computer system with which some embodiments of the present invention may be utilized.

An exemplary computer system 1800, representing an exemplary server or client system, with which various features of the present invention may be utilized, will now be described with reference to FIG. 18. In this simplified example, the computer system 1800 comprises a bus 1801 or other communication means for communicating data and control information, and one or more processors 1802, such as Intel® Itanium® or Itanium 2 processors, coupled with bus 1801.

Computer system 1800 further comprises a random access memory (RAM) or other dynamic storage device (referred to as main memory 1804), coupled to bus 1801 for storing information and instructions to be executed by processor(s) 1802. Main memory 1804 also may be used for storing temporary variables or other intermediate information during execution of instructions by processor(s) 1802.

Computer system 1800 also comprises a read only memory (ROM) 106 and/or other static storage device coupled to bus 1801 for storing static information and instructions for processor(s) 1802.

A mass storage device 1807, such as a magnetic disk or optical disc and its corresponding drive, may also be coupled to bus 1801 for storing information and instructions.

One or more communication ports 1803 may also be coupled to bus 1801 for supporting network connections and communication of information to/from the computer system 1800 by way of a Local Area Network (LAN), Wide Area Network (WAN), the Internet, or the public switched telephone network (PSTN), for example. The communication ports 1803 may include various combinations of well-known interfaces, such as one or more modems to provide dial up capability, one or more 10/100 Ethernet ports, one or more Gigabit Ethernet ports (fiber and/or copper), or other well-known network interfaces commonly used in current or future internetwork environments.

Optionally, operator and administrative interfaces (not shown), such as a display, keyboard, and a cursor control device, may also be coupled to bus 1801 to support direct operator interaction with computer system 1800. Other operator and administrative interfaces can be provided through network connections connected through communication ports 1803.

Finally, removable storage media 1805, such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 1801 via corresponding drives, ports or slots.

In conclusion, the present invention provides novel systems, methods and arrangements for motor-driven curtain or blind assemblies. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A curtain or blind assembly comprising:

a track having a plurality of coils fixed along the track, wherein the plurality of coils can be electrically activated to generate an electromagnetic field, wherein the track includes an iron strip to increase the electromagnetic field, and a carrier which provides electrical insulation and is interposed between the iron strip and the plurality of coils, and wherein the plurality of coils are placed in pairs along the track and configured to be electrically connected to different polarities to create alternating north and south poles;

a lead runner with a magnet housing which houses a permanent magnet, the lead runner configured to slide along the track in response to an activation of the electromagnetic field triggered by an application that executes on a mobile device; and a plurality of sensors and switches disposed between the plurality of coils, wherein during operation, when the permanent magnet is disposed directly under a subset of the plurality of coils, a magnetic field of the permanent magnet is configured to cause contact closure in a subset of the plurality of switches corresponding to the subset of plurality of coils to allow electrical power flow exclusively to the subset of the plurality of coils to activate the electromagnetic field therein to cause the lead runner slide along the track, while a remaining of the plurality of coils do not receive electrical power.

2. The assembly of claim 1, further comprising a carrier assembly coupled to the magnet housing, wherein the carrier assembly includes one or more openings allowing a curtain to be attached.

3. The assembly of claim 1, further comprising a solar panel positioned to fit along a side of the track.

4. The assembly of claim 1, further comprising a motor control unit having one or more control interfaces.

5. The assembly of claim 4, wherein the one or more control interfaces includes a WiFi interface or a radio frequency interface.

6. The assembly of claim 5, wherein the one or more control interfaces can receive instructions from a remote control or an application running on a computing device.

7. The assembly of claim 1, further comprising a WiFi transceiver to receive control signals.

8. A method for driving a curtain or blind assembly, the method comprising:

receiving a control signal that indicates a desired position of a lead runner along a track that has fixed thereto a plurality of coils capable of being electrically activated to generate a local electromagnetic field, wherein the track includes an iron strip to increase the electromagnetic field, and a carrier which provides electrical insulation and is interposed between the iron strip and the plurality of coils, wherein the plurality of coils are placed in pairs along the track and configured to be electrically connected to different polarities to create alternating north and south poles, and wherein a plurality of switches are disposed between the plurality of coils;

determining a current position of the lead runner along the track, wherein the lead runner has a magnet housing which houses a permanent magnet; and selectively activating a subset of the plurality of coils located near the lead runner and the permanent magnet to generate the local electromagnetic field to cause the lead runner to slide along the track to the desired position, by having a magnetic field of the permanent magnet cause contact closure in a subset of a plurality of switches corresponding to the subset of the plurality of coils to allow electrical power flow exclusively to the subset of the plurality of coils to activate the local electromagnetic field therein, while a remaining of the plurality of coils do not receive electrical power.

9. The method of claim 8, further comprising regulating velocity of the lead runner to a desired velocity.

10. The method of claim 8, further comprising generating a status signal indicating the current position of the lead runner and transmitting the status signal to a remote device.

11. A curtain or blind assembly comprising:

a track having a plurality of coils fixed along the track, wherein the coils can be electrically activated to generate an electromagnetic field, and wherein the track includes an iron strip to increase the electromagnetic field, and a carrier which provides electrical insulation and is interposed between the iron strip and coils, wherein the plurality of coils are placed in pairs along the track and configured to be electrically connected to different polarities to create alternating north and south poles, and wherein a plurality of switches are disposed between the plurality of coils;

a lead runner with a magnet housing which houses a permanent magnet, the lead runner configured to slide along the track in response to an activation of the electromagnetic field triggered by an application that executes on a mobile device; and a means for detecting a position of the lead runner along the track and for activating the electromagnetic field to cause the lead runner to move to a desired location on the track, by having a magnetic field of the permanent magnet cause contact closure in a subset of a plurality of switches corresponding to the subset of the plurality of coils to allow electrical power flow exclusively to the subset of the plurality of coils to activate the local electromagnetic field therein to cause the lead runner slide along the track, while a remaining of the plurality of coils do not receive electrical power.

12. The assembly of claim 11, further comprising a means for regulating the velocity of the lead runner.

13. The assembly of claim 11, further comprising a power management module to monitor the power available from a rechargeable power store and from a power supply.

14. The assembly of claim 11, further comprising a carrier assembly coupled to the lead runner, wherein the carrier assembly includes one or more openings allowing a curtain to be attached.

15. The assembly of claim 11, further comprising a means for collecting and storing solar energy.

* * * * *